March 4, 1947. T. A. ST. CLAIR 2,416,855
HIGH-PRESSURE DIAPHRAGM RELIEF VALVE
Filed Nov. 9, 1943
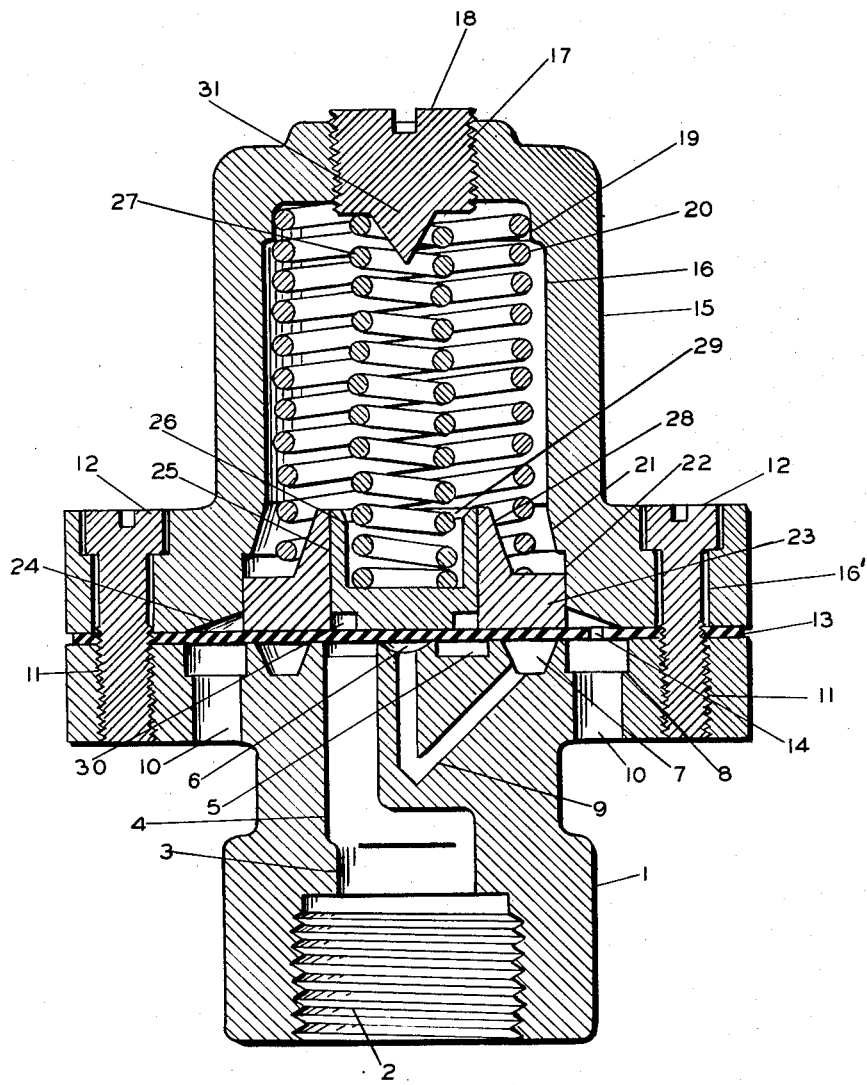
INVENTOR
T. A. ST. CLAIR

UNITED STATES PATENT OFFICE 2,416,855

HIGH-PRESSURE DIAPHRAGM RELIEF VALVE

Theodore A. St. Clair, Pontiac, Mich., assignor to Phillips Petroleum Company, a corporation of Delaware Application November 9, 1943, Serial No. 509,594

7 Claims. (Cl. 137—53)

This invention relates to relief valves and it has particular relation to relief valves of the pilot or pop valve type.

One object of the invention is to provide a high pressure relief valve which is compact and relatively cheap and in which a relatively large force is available for unseating a relatively small nozzle area.

Another object is to provide such a valve in which tendencies of the valve to stick are greatly reduced and a relatively fixed relieving pressure is maintained.

Another object of the invention is to provide a diaphragm operated pilot type relief valve.

Numerous other objects and advantages will be obvious from reading the following specification and claims and studying the accompanying drawings.

In the drawings:

The single figure is a cross sectional view of a valve embodying my invention.

The valve consists of a lower body 1 provided with internal screw threads 2 for attachment to a pressure vessel containing fluid under pressure any excess pressure of which it is desired to relieve. Connection 2 obviously is not limited to internal screw threads as any form of internal or external pipe connection may be used at this point.

A bore 3 conducts the fluid under pressure through an eccentrically located passage 4 to an annular groove 5 cut in the face of the body 1. Body 1 is also provided with a central depression 6 concentrically located in the center of concentric annular grooves 5, 7 and 8. A communicating passage 9 is cut between central depression 6 and annular groove 7. Passage 9 may be formed by drilling two intersecting holes.

Annular groove 8 is connected to the exterior by a series of cylindrical holes 10. The upper face of body 1 containing the concentric grooves lies substantially in the same plane between and around the grooves. Screw threaded holes 11 are provided at suitable intervals to receive screws 12 which hold the parts of the valve together.

A flexible diaphragm 13 is provided and may be made of any suitable material such as natural or artificial rubber. Diaphragm 13 may be provided with holes 14 at suitable intervals over annular groove 8 to equalize the pressures of fluids on both sides of the diaphragm.

The upper part of the valve consists of a housing 15 which has holes 16' provided for screws 12 to secure housing 15 to body 1. A circular internal bore 16 is provided in the housing which is of several different diameters. Bore 16 at the top is preferably reduced to a screw threaded or other adjustable connection 17 for the reception of screw threaded plug 18 which provides adjustment of the valve as described later. After passing below 17, bore 16 widens out to bore 19 which acts to center spring 20. To provide room for spring 20, the bore then widens out to the portion marked 16 and flares at 21 to provide any extra space necessary to guide spring 20 into place and finally widening at 22 to provide a guide for an outer piston 23 and flaring at 24 to provide room for the flexing of the diaphragm 13.

Seated on diaphragm 13 and guided in bore 22 is the outer piston 23 which is urged downward against the diaphragm by the spring 20. Piston 23 has a central concentric circular bore 25 in which inner piston 26 slides. Inner piston 26 is urged down against diaphragm 13 by spring 27, the tension of spring 27 being adjusted by screw threaded plug 18. The upper surface of outer piston 23 is beveled at 28 to aid in assembly and in guiding spring 20, and the upper inner edge of inner piston 26 is beveled at 29 to cooperate similarly with spring 27. Piston 26 has an annular groove 30 in its outer lower edge to give the diaphragm 13 relief and insure seating of the piston 26 over the central depression 6. Plug 18 is provided with central boss 31 to center the spring 27.

The operation of the valve is as follows:

Plug 18 is set to provide the right amount of compression in spring 27. This adjusts the relief or opening pressure. If desired, plug 18 and its adjustment may be eliminated relying on choosing the strength of spring 27 and casting boss 31 integral with 15. When the fluid passing out through bores 2, 3 and 4 and passing around annular groove or passage 5 reaches sufficient pressure to compress spring 27, the central portion of diaphragm 14 bulges upwardly and piston 26 rises inside of piston 23 compressing spring 27 and exposing central depression or passage 6 to the fluid from annular passage 5, the fluid flowing between diaphragm 13 and the lip or rim between the passages 5 and 6.

The fluid pressure is immediately transmitted through passage 9 to annular groove 7, and as groove 7 has approximately four times as much area of contact with the diaphragm as groove 5 and as springs 20 and 27 are designed to give approximately the same force, both springs 20 and 27 are rapidly compressed and both pistons 23 and 26 are rapidly raised and diaphragm 13 is moved back to surface 24 and is arched over the central portion of body 1. The rapid release of large quantities of fluid then takes place through passages 2, 3, 4 and across the surface of the top of body 1 to discharge through holes 10 to the atmosphere, suddenly opening the entire valve. When the pressure has receded to a certain point the central spring 27 will urge the small area piston 26 back before large area piston 23 can move and the central portion of diaphragm 13 will seat on the rim around central depression 6. This will rapidly cut off the pressure in annular groove or chamber 7 and piston 23 urged by spring 20 will rapidly return diaphragm 13 to its original position contacting the entire upper surface of body 1 and closing the valve suddenly.

It will be evident from the above description of the operation that I have devised a diaphragm type valve that will open suddenly without tendency to stick at a definite pressure operating in the manner of a pilot or pop valve and which will close suddenly at a definite pressure all as set forth above.

Changes may obviously be made in the structural details and design and relation of parts without involving invention once the principle of my invention is understood, which is that the central part of a diaphragm yields at a definite pressure allowing the fluid to gain access to a larger area to open the valve, but such changes are within the scope of my invention which scope is only limited by the following claims.

Having described my invention, I claim:

1. A relief valve for a source of fluid under pressure comprising in combination a body having an inlet and a central depression and three concentric annular grooves, a diaphragm sealing against the edges of the depression and the annular grooves, the body having a passage between the depression and the middle annular groove, a passage from the inlet to the inner annular groove and a passage from the outer annular groove to the atmosphere, a central piston, means to tension said central piston against said diaphragm to provide a seal between the inner annular groove and the central depression, and an outer piston and means to tension the outer piston against the diaphragm to provide a seal between the middle annular groove and the outer annular groove.

2. A relief valve for a source of fluid under pressure comprising in combination a body having an inlet and a first depression and a second, third and fourth depression therein disposed outwardly in numerical order from the first depression, a diaphragm sealing against the edges of all the depressions, the body having a passage between the first depression and the third depression, a passage from the inlet to the second depression and a passage from the fourth depression to the atmosphere, a first means to bias the diaphragm to seal between the first and second depressions, and a second means to bias the diaphragm to seal between the third and fourth depressions.

3. A relief valve for a source of fluid under pressure comprising in combination a body having an inlet and a central depression and at least two grooves disposed around said central depression, the body having a passage providing communication from the central depression to the second groove in order outwardly therefrom, a passage leading from the first groove outwardly from the central depression and communicating with the inlet, and passages leading to the atmosphere outwardly of said second groove, a diaphragm disposed adjacent said depression, grooves and passages, means to bias the diaphragm to seal between the central depression and said first groove, and means to bias the diaphragm to seal between said second groove and the atmosphere.

4. A relief valve for a source of pressure fluid comprising in combination a body having an inlet and two chambers, a conduit supplying pressure fluid from said inlet to the first of the chambers, and a conduit communicating with the atmosphere all formed in said body, first valve means opening at a predetermined pressure of said fluid in said first chamber, means to adjust the valve to vary said predetermined pressure, said valve when open providing passage for said pressure fluid to the second of said chambers, second valve means controlling flow between the second of said chambers and the conduit communicating with the atmosphere and between said first and second chambers, said second valve means being constructed and arranged to open at a pressure lower than said predetermined pressure whereby pop action is provided in the opening of the relief valve.

5. A relief valve for a source of pressure fluid comprising in combination a body having an inlet and two chambers, a conduit supplying pressure fluid from said inlet to the first of the chambers, and a conduit communicating with the atmosphere all formed in said body, first valve means opening at a predetermined pressure of said fluid in said first chamber, said valve when open providing passage for said pressure fluid to the second of said chambers, second valve means controlling flow between the second of said chambers and the conduit communicating with the atmosphere and between said first and second chambers, said second valve means being constructed and arranged to open at a pressure lower than said predetermined pressure whereby pop action is provided in the opening of the relief valve.

6. A relief valve for a source of fluid comprising a body, a housing secured to the body, a diaphragm secured between the housing and the body for contact with said body, said body having an inlet, a recessed chamber and an outlet formed therein and sealed from one another by said diaphragm when said diaphragm is in contact with said body, said diaphragm being movable to a position in which communication between said inlet, said chamber and said outlet is established, first spring means yieldably urging a portion of said diaphragm into contact with said body to provide a first seal between said inlet and said chamber which first seal opens only at a predetermined inlet pressure, and separate second spring means yieldably urging a portion of said diaphragm into contact with said body to provide a second seal between said inlet and said chamber and a third seal between said chamber and said outlet, which second and third seals are constructed and arranged to open and remain open whenever and as long as said first seal is open, said first spring means being adjustable.

7. A relief valve for a source of fluid comprising a body, a housing secured to the body, a diaphragm secured between the housing and the body for contact with said body, said body having an inlet, a recessed chamber and an outlet formed therein and sealed from one another by said diaphragm when said diaphragm is in contact with said body, said diaphragm being movable to a position in which communication between said inlet, said chamber and said outlet is established, first spring means yieldably urging a portion of said diaphragm into contact with said body to provide a first seal between said inlet and said chamber which first seal opens only at a predetermined inlet pressure, and separate second spring means yieldably urging a portion of said diaphragm into contact with said body to provide a second seal between said inlet and said chamber and a third seal between said chamber and said outlet, which second and third seals are constructed and arranged to open and remain open whenever and as long as said first seal is open.

THEODORE A. ST. CLAIR.

REFERENCES CITED

The following references are of record in the file of this patent:

UNITED STATES PATENTS

| Number | Name | Date |
|---|---|---|
| 2,208,181 | Eggleston | July 16, 1940 |
| 1,786,844 | Hesselman | Dec. 30, 1930 |
| 306,386 | Crosby | Oct. 14, 1884 |
| 1,988,026 | Unger | Jan. 15, 1935 |
| 2,162,898 | Rotter | June 20, 1939 |
| 1,871,535 | Lattner | Aug. 16, 1932 |
| 538,703 | Schreidt | May 7, 1895 |
| 231,214 | Curtis | Aug. 17, 1880 |
| 235,748 | Chrisp | Dec. 21, 1880 |

FOREIGN PATENTS

| Number | Country | Date |
|---|---|---|
| 597,093 | German | May 17, 1934 |